United States Patent [19]

Hart

[11] 4,059,391

[45] Nov. 22, 1977

[54] PROCESS FOR PRODUCING REFRACTORY MATERIAL

[75] Inventor: Alan M. Hart, Midland, Mich.

[73] Assignee: The Dow Chemical Company, Midland, Mich.

[21] Appl. No.: 663,384

[22] Filed: Mar. 3, 1976

[51] Int. Cl.² .................... F27B 15/00; C04B 35/00
[52] U.S. Cl. ........................................ 432/13; 106/58
[58] Field of Search ............... 432/13, 14, 15; 106/58

[56] References Cited

U.S. PATENT DOCUMENTS

| | | | |
|---|---|---|---|
| 3,060,000 | 10/1962 | Snyder et al. | 106/58 |
| 3,060,042 | 10/1962 | Leatham et al. | 106/58 |
| 3,085,022 | 4/1963 | Koch | 432/13 |

FOREIGN PATENT DOCUMENTS

| | | | |
|---|---|---|---|
| 1,270,412 | 7/1961 | France | 106/58 |

*Primary Examiner*—John J. Camby
*Attorney, Agent, or Firm*—J. M. Kuszas

[57] ABSTRACT

An improvement in a process for producing refractory material by sintering compacts of particles of a calcined ceramic compound is disclosed. The improvement comprises heating the compacts in a fluidized bed maintained at a temperature sufficient to sinter the compacts.

10 Claims, No Drawings

PROCESS FOR PRODUCING REFRACTORY MATERIAL

BACKGROUND OF THE INVENTION

The present invention relates to a process for producing refractory material and more in particular to an improved process to produce refractory material by sintering.

Refractory materials such as the oxides of magnesium, calcium, aluminum, and zicronium are conventionally manufactured by heating the raw material to achieve decomposition and densification.

One general process for producing a refractory material, such as sintered magnesium oxide (periclase), involves two seperate heating steps in which the decomposition and densification steps are separated and optimized. This optimization is designed to increase the bulk density of the refractory material.

A typical two-stage process, such as that used to produce sintered magnesium oxide, normally employs an initial heating step at about 900° C using a multiple-hearth calciner for decomposition and a second heating step employing either a shaft or rotary kiln for densification. Heating for densification normally occurs at temperatures in excess of 1700° C and is generally referred to as sintering. The normal two-stage process usually includes a separate compacting process prior to sintering. Generally, the calcined magnesium oxide is formed into seperate briquette compacts by mechanical compaction.

One general description of a two-stage process for producing sintered magnesium oxide is shown in U.S. Pat. No. 3,060,000.

In the known process of using a shaft or rotary kiln for sintering, it has been necessary to fire the kiln at very high temperatures in order increase the bulk densities of the refractory material. However, the bulk density of the product produced has oftentimes not been as high as desired. It is, therefore, desirable that an improved sintering process for producing refractory material with increased density be developed.

SUMMARY OF THE INVENTION

The present invention is an improved process to produce refractory material by heating compacts of particles of a calcined ceramic compound in a fluidized bed maintained at a temperature sufficient to sinter the compacts.

DESCRIPTION OF THE PREFERRED EMBODIMENT

In carrying out the process of the present invention, compacts of particles of a calcined ceramic compound are introduced into a fluidized bed of particles preferrably maintained in a refractory lined fluidization furnace.

The calcined ceramic compound is preferably a calcined ceramic oxide generally containing at least one member selected from the group consisting of magnesium oxide, calcium oxide, aluminum oxide, and zirconium oxide. Magnesium oxide is especially preferred. Minor impurities generally associated with commercially pure calcined ceramic oxides such as iron (III) oxide and silicon dioxide may also be present.

The compacts have generally been initially aggregated by suitable techniques, such as by addition of binders or by compression by suitable means, such as a pellet press. The compacts preferably have their longest dimension from about 0.006 to about 0.500 inch.

The fluidized bed of particles of the present invention contains particles of the ceramic compound at various stages of densification. Optionally, the fluidized bed of particles can contain previously sintered ceramic material of the calcined ceramic compound, particles of the calcined ceramic compound, or a compound thermally decomposable to the ceramic compound. However, the preferred fluidized bed of particles comprises particles of the sintered ceramic compound.

For example, when the calcined ceramic compound is magnesium oxide, sintered magnesium oxide forms the preferred fluidized bed. The ceramic compound forming the fluidized bed preferably contains particles whose longest dimension is from about 0.006 inch to about 0.250 inch.

The bed is fluidized in a conventional manner wherein a gas passes upward through the bed at a rate and volume sufficient to suspend the solid particles therein. Preferably, the gas employed is suspending the fluidized bed is substantially chemically unreactive with the calcined ceramic compound unless reaction facilitates impurity removal. The gas may include air and mixtures of air and the combustion products of propane, oxygen, natural gas, oil, or other fuels. A mixture of air and the combustion products of oxygen and propane has been found to be a suitable gas for the fluidization of a bed of magnesium oxide in the production of sinterd magnesium oxide.

In addition to serving as the gaseous means for fluidization, the combustion gases can, optionally, be employed to provide at least a portion of the heat used for sintering within the fluidized bed. The fluidized bed may additionally be heated by a suitable heating means, such as a burner assembly. However, preferably at least a portion of the heating is carried out by passing a mixture of air and the combustion gases of oxygen and propane through the fluidized bed.

Optionally, at least a portion of the fluidized bed can be heated by introducing a carbonaceous type fuel, such as coal, into the fluidized bed along with the compacts of the calcined ceramic compound. After initial ignition of the fuel, the bed is heated internally by the continuous combustion of the fuel within the bed.

The fluidized bed is maintained at a temperature sufficient to sinter the compacts of the calcined ceramic compound. Preferably the fluidized bed is maintained at a sintering temperature of at least about 50% of the theoretical melting temperature of the calcined ceramic compound. For example, the fluidized bed is maintained at least at about the following preferred sintering temperatures for the pure compounds listed: about 1400° C for magnesium oxide (melting point 2800° C); about 1290° C for calcium oxide (melting point 2580° C); about 1022° C for aluminum oxide (melting point 2045° C); and about 1358° C for zirconium oxide (melting point 2715° C).

The matrix material used to form the fluidized bed is gradually introduced into the fluidizing furnace and heated to the operating temperature of the fluidized bed. The compacts of calcined ceramic compound introduced into the fluidized bed move in a direction generally countercurrent to the fluidizing medium. The moving compacts are heated by the bed for a sufficient time to sinter the calcined ceramic compound to a material suitable for use as a refractory or in refractory products. As the bulk density of the material being sintered increases, the denser material is taken from the fluidized bed during heating and is discharged from the lower portion of the bed while it is still hot. The preferred residence time of the compacts for a ceramic compound such as 96 percent by weight magnesium oxide is at least about 10 minutes and more preferably about 40 minutes when the fluidized bed is maintained at a temperature of from about 1450° to about 1550° C.

The refractory material produced by sintering in accordance with the preferred embodiment of the present process surprisingly has a bulk density of at least about 93 percent of the theoretical density of the sintered refractory material.

The bulk density of the sintered material is defined and determined by the standard method of testing for bulk density and porosity of granular refractory materials by mercury displacement (American Society for Testing Material Designation: C493-70). The theorectical density is generally that reported for the pure material in *Handbook of Chemistry and Physics*, 49th Edition, The Chemical Rubber Co. (1968).

An advantage of the fluidized bed process for sintering is that the compacts undergo more uniform process conditions and more intimate contact with the combustion gases. This increase thermal effeciency and can allow generally lower operating temperatures to be used in the sintering of the compacts to form refractory material of generally higher bulk density than produced by conventional sintering processes.

The following examples are illustrative of the invention:

EXAMPLE 1

A 500 gram quantity of magnesium oxide containing about 96% by weight magnesium oxide and about 4% by weight impurities comprising fractional weight percents of other oxides was calcined at about 900° C in a multiple hearth calciner. The calcined magnesium oxide powder was then pressed into cylindrical pellets about 0.180 inch in diameter by about 0.250 inch long. The pellets were prepared by applying about 40,000 pounds per square inch pressure to the powder using a pellet press such as a Stokes ® pellet press. This calcined magnesium oxide was used as feed material for sintering in the fluidized bed.

An additional 500 grams of magnesium oxide was introduced into the top of a 3 inch inside diameter refractory-lined fluidizing furnace to form the matrix material of the fluidized bed. The matrix material was screened so that it contained particles whose longest dimension was from about 0.010 to about 0.030 inch.

The refractory-lined fluidization furnace was equipped with a double ring burner assembly inserted at the base of the furnace so that it was coaxial with the bed. Air was used at the outer ring and oxygen and propane were mixed for combustion at the inner tip of the burner assembly. The propane and oxygen rates were maintained at about 0.30 and about 1.0 standard cubic feet per minute. (scfm), respectively. The outer burner air rate was initially about 3.0 (scfm), but was decreased to about 1.8 scfm as the bed approached the operating temperature of about 1500° C.

When the fluidized bed temperature was substantially about 1500° C throughout, compacts of the calcined magnesium oxide to be sintered were gradually introduced into the top of the bed. This was accomplished within about a 5 minute period by conventional means. Adjustment of the propane and oxygen level provided control of bed temperature. Based on temperature readings from three immersed thermocouples, the temperature of the bed ranged from 1480° to 1520° C during the entire sintering process.

A graphite tube with an inside diameter of one inch was used to withdraw 10 gram samples of the calcined magnesium oxide from the bed during the sintering process. These sintered samples were taken from the bottom of the fluidizing furnace at about 10 minute intervals for the first hour and at about 30 minute intervals for the next two hours. During this period no other sintered magnesium oxide was removed from the fluidized bed.

The bulk densities of the sintered magnesium oxide obtained by the present process are shown in Table I. Densification of up to 3.48 gram per cubic centimeter (g/cc) (about 97.2% of theoretical density of 3.58 g/cc) was obtained within about 40 minutes of introduction into the fluidized bed. A conventional sintering process, such as that shown in U.S. Pat. No. 3,060,000, produces a sintered magnesium oxide with a bulk density of only about 3,29 gm/cc. (about 92% of the theoretical density).

EXAMPLE 2

A 500 gram sample of magnesium oxide containing about 98% by weight magnesium oxide and about 2% by weight of impurities comprising fractional weight percents of other oxides was treated by substantially the same process as disclosed in Example 1. The sintered compacts showed densification up to 3.35 g/cc (about 93.6% of theoretical density) after about 2 hours. The apparent specific gravities are presented in detail in Table I.

TABLE I

BULK DENSITY OF MAGNESIUM OXIDE FROM FLUIDIZED BED FURNACE

| Time | Example 1 (g/cc) | Example 2 (g/cc) |
|---|---|---|
| 10 min | 3.40 | 3.21 |
| 20 | 3.42 | 3.20 |
| 30 | 3.45 | 3.25 |
| 40 | 3.48 | 3.27 |
| 50 | 3.48 | 3.26 |
| 60 | 3.44 | 3.30 |
| 90 | 3.45 | 3.33 |
| 120 | 3.46 | 3.35 |
| 150 | 3.45 | 3.33 |
| 180 | 3.46 | 3.33 |

EXAMPLES 3–5

500 gram samples of calcium oxide, aluminum oxide and zirconium oxide are treated by substantially the same process as the calcined ceramic oxide disclosed in Example 1. The densities of the sintered compacts will be at least about 93% of the theoretical density of the material.

What is claimed is:

1. In a process for the densification of calcined magnesium oxide by sintering compacts of particles of the calcined magnesium oxide, the improvement which comprises:
   a. heating the compacts within the temperature range of from about 1450° C to about 1550° C in a fluidized bed of particles containing magnesium oxide; and
   b. retaining the compacts within the fluidized bed of particles for a sufficient time to sinter the compacts to a material having a bulk density of at least about 93 percent of the theoretical bulk density of the calcined magnesium oxide compacts heated in the fluidized bed.

2. The method of claim 1 wherein the fluidized bed of particles contains magnesium oxide at various stages of densification.

3. The method of claim 1 wherein the fluidized bed of particles contains particles whose longest dimension is from about 0.006 inch to about 0.250 inch.

4. The method of claim 1 wherein the fluidized bed of particles comprises sintered magnesium oxide.

5. The method of claim 1 wherein the compacts have their longest dimension from about 0.006 inch to about 0.500 inch.

6. The method of claim 1 wherein the fluidized bed is fluidized by passing gas through the bed.

7. The method of claim 1 wherein the gas is a mixture of air and combustion gases.

8. The method of claim 1 wherein at least a portion of the heating is carried out by passing a mixture of air and combustion gases of oxygen and propane through the fluidized bed.

9. The method of claim 1 where at least a portion of the heating is carried out by the combustion of coal within the fluidized bed.

10. In a process for producing sintered magnesium oxide by sintering compacts of particles containing at least about 96 percent by weight calcined magnesium oxide, said compacts having their longest dimension from about 0.006 inch to about 0.500 inch, the improvement which comprises:

a. heating the compacts within the temperature range of from about 1450° C to about 1550° in a fluidized bed of particles containing magnesium oxide; and b. retaining the compacts within the fluidized bed of particles for a sufficient time to sinter the compacts to a material having a bulk density of at least about 3.35 grams per cubic centimeter.

* * * * *

UNITED STATES PATENT AND TRADEMARK OFFICE
CERTIFICATE OF CORRECTION

PATENT NO. : 4,059,391
DATED : November 22, 1977
INVENTOR(S) : Alan M. Hart

Page 1 of 2 Pages

It is certified that error appears in the above–identified patent and that said Letters Patent are hereby corrected as shown below:

Column 1, line 11, delete "zicronium" and insert --zirconium--.

Column 1, line 16, delete "seperate" and insert --separate--.

Column 1, line 31, delete "seperate" and insert --separate--.

Column 1, line 41, delete "therfore" and insert --therefore--.

Column 1, line 43, insert --bulk-- in front of density.

Column 2, line 21, delete "is" and insert --in--.

Column 2, line 29, delete "sinterd" and insert --sintered--.

UNITED STATES PATENT AND TRADEMARK OFFICE
CERTIFICATE OF CORRECTION

PATENT NO. : 4,059,391                                   Page 2 of
DATED      : November 22, 1977                           2 Pages
INVENTOR(S) : Alan M. Hart It is certified that error appears in the above-identified patent and that said Letters Patent are hereby corrected as shown below:

Column 3, line 18, add --and-- in front of Material.

Column 3, line 18, delete "theorecti-" and insert --theoreti- --.

Column 3, line 25, delete "increase" and insert --increases--.

Column 3, line 24, delete "effeciency' and insert --efficiency--.

Column 3, Example 1, line 59, delete the period after minute.

Column 4, Example 1, line 22, delete "3,29" and insert --3.29--.

Column 5, Claim 7, line 17, delete "1" and insert --6--.

Signed and Sealed this

Thirtieth Day of May 1978

[SEAL]

Attest:

RUTH C. MASON  
Attesting Officer

LUTRELLE F. PARKER  
Acting Commissioner of Patents and Trademarks